United States Patent
Yu et al.

(10) Patent No.: US 12,446,084 B2
(45) Date of Patent: Oct. 14, 2025

(54) AUDIO DATA TRANSMISSION METHOD AND APPARATUS FOR WIRELESS EARPHONE, AND STORAGE MEDIUM AND TERMINAL

(71) Applicant: SPREADTRUM COMMUNICATIONS (SHANGHAI) CO., LTD., Shanghai (CN)

(72) Inventors: Yanzhi Yu, Shanghai (CN); Ziquan Zhou, Shanghai (CN); Hao Li, Shanghai (CN); Long Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 627 days.

(21) Appl. No.: 17/780,079

(22) PCT Filed: Sep. 9, 2020

(86) PCT No.: PCT/CN2020/114148
§ 371 (c)(1),
(2) Date: May 26, 2022

(87) PCT Pub. No.: WO2021/103739
PCT Pub. Date: Jun. 3, 2021

(65) Prior Publication Data
US 2022/0418021 A1    Dec. 29, 2022

(30) Foreign Application Priority Data
Nov. 27, 2019    (CN) .......................... 201911184759.9

(51) Int. Cl.
*H04W 76/15* (2018.01)
*H04R 5/04* (2006.01)

(52) U.S. Cl.
CPC .............. *H04W 76/15* (2018.02); *H04R 5/04* (2013.01); *H04R 2420/07* (2013.01)

(58) Field of Classification Search
CPC ......... H04W 76/15; H04W 4/70; H04W 4/80; H04R 5/04; H04R 2420/07;
(Continued)

(56) References Cited

U.S. PATENT DOCUMENTS 9,820,024 B1    11/2017    Rolf
2008/0232299 A1    9/2008    Mosig
(Continued)

FOREIGN PATENT DOCUMENTS

CN    103607780 A    2/2014
CN    203827496 U    9/2014
(Continued)

OTHER PUBLICATIONS

International Search Report for International Application No. PCT/CN2020/114148; Date of Mailing, Dec. 11, 2020.
(Continued)

*Primary Examiner* — Dinh Nguyen
(74) *Attorney, Agent, or Firm* — CANTOR COLBURN LLP

(57) ABSTRACT

An audio data transmission method and apparatus for a wireless earphone, and a storage medium and a terminal are provided. A play mode adopted by the wireless earphone includes a first play mode and a second play mode, and the method includes: determining whether the first play mode currently adopted by the wireless earphone satisfies a transmission bandwidth required by to-be-played audio data at least based on parameter information of the to-be-played audio data; and based on the first play mode not satisfying the transmission bandwidth required by the to-be-played audio data, transmitting the to-be-played audio data through
(Continued)

a connection channel corresponding to the second play mode.

18 Claims, 5 Drawing Sheets

(58) Field of Classification Search
CPC .............. H04R 2460/03; H04R 1/1041; H04R 1/1091; H04R 5/033; H04R 3/00; H04M 1/6066; H04M 2250/02; H04M 2250/06; H04B 5/72; H04B 5/00
See application file for complete search history.

(56) References Cited

U.S. PATENT DOCUMENTS

| | | |
|---|---|---|
| 2011/0053638 A1 | 3/2011 | Nakamura et al. |
| 2017/0264987 A1 | 9/2017 | Hong et al. |
| 2019/0320369 A1 | 10/2019 | Yang et al. |

FOREIGN PATENT DOCUMENTS

| | | | | |
|---|---|---|---|---|
| CN | 204104109 U | | 1/2015 | |
| CN | 104618383 A | * | 5/2015 | |
| CN | 105812185 A | | 7/2016 | |
| CN | 106101991 A | | 11/2016 | |
| CN | 107182011 A | | 9/2017 | |
| CN | 108471638 A | * | 8/2018 | ........... H04R 1/1041 |
| CN | 106293602 B | * | 8/2019 | ............. G06F 3/162 |
| CN | 106792954 B | | 2/2020 | |
| CN | 111224693 A | | 6/2020 | |
| JP | 2019033305 A | | 2/2019 | |
| TW | 200805901 A | * | 1/2008 | ............. G10L 19/00 |
| WO | 2018120389 A1 | | 7/2018 | |

OTHER PUBLICATIONS

CNIPA 1st Office Action for corresponding CN Application No. 201911184759.9; Isssued on Jan. 27, 2021.
EPO Partial Supplementary European Search Report for corresponding EP Application No. 20894058.5; Issued on May 25, 2023.
EPO Examination for corresponding EP Application No. 20894058.5; Issued Sep. 1, 2025.

* cited by examiner

AUDIO DATA TRANSMISSION METHOD AND APPARATUS FOR WIRELESS EARPHONE, AND STORAGE MEDIUM AND TERMINAL

CROSS-REFERENCE TO RELATED APPLICATIONS

This is the U.S. national stage application of application No. PCT/CN2020/114148, filed on Sep. 9, 2020. Priority under 35 U.S.C. § 119(a) and 35 U.S.C. § 365(b) is claimed from Chinese Application No. 201911184759.9, filed on Nov. 27, 2019, the disclosure of which is also incorporated herein by reference.

TECHNICAL FIELD

The present disclosure generally relates to wireless earphone technology field, and more particularly, to an audio data transmission method and apparatus for a wireless earphone, a storage medium and a terminal.

BACKGROUND

Existing solutions for wireless high-definition earphones are generally implemented based on Bluetooth technology. However, the Bluetooth technology cannot meet bandwidth requirements of high-definition lossless music. Specifically, a transmission bandwidth required for high-definition lossless music is generally as high as Million bits per second (Mbps), while a wireless transmission bandwidth of the Bluetooth technology is limited and cannot transmit such high-definition lossless music. Therefore, existing high-definition music transmitted based on the Bluetooth technology still adopts lossy compression, resulting in the existing wireless high-definition earphones based on the Bluetooth technology only supporting lossy high-definition music.

SUMMARY

Embodiments of the present disclosure provide solutions for wireless true high-definition lossless earphone, where both sound quality and power consumption are considered.

In an embodiment of the present disclosure, an audio data transmission method for a wireless earphone is provided, wherein a play mode adopted by the wireless earphone includes a first play mode and a second play mode, and the method includes: determining whether the first play mode currently adopted by the wireless earphone satisfies a transmission bandwidth required by to-be-played audio data at least based on parameter information of the to-be-played audio data; and based on the first play mode not satisfying the transmission bandwidth required by the to-be-played audio data, transmitting the to-be-played audio data through a connection channel corresponding to the second play mode.

In an embodiment of the present disclosure, a storage medium having computer instructions stored therein is provided, wherein when the computer instructions are executed, the above method is performed.

In an embodiment of the present disclosure, a terminal including a memory and a processor is provided, wherein the memory has computer instructions stored therein, and when the processor executes the computer instructions, the above method is performed.

DETAILED DESCRIPTION

As described in the background, the existing wireless high-definition earphones based on the Bluetooth technology only support lossy high-definition music. Besides, although wireless earphones based on single Wi-Fi technology can support a large transmission bandwidth, power consumption is not well controlled, and a standby time of the wireless earphones is too short.

Embodiments of the present disclosure provide an audio data transmission method for a wireless earphone is provided, wherein a play mode adopted by the wireless earphone includes a first play mode and a second play mode, and the method includes: determining whether the first play mode currently adopted by the wireless earphone satisfies a transmission bandwidth required by to-be-played audio data at least based on parameter information of the to-be-played audio data; and based on the first play mode not satisfying the transmission bandwidth required by the to-be-played audio data, transmitting the to-be-played audio data through a connection channel corresponding to the second play mode.

Solutions in the embodiments of the present disclosure enable to switch between different play modes based on quality requirements of to-be-played music and make it possible to realize a wireless true high-definition lossless earphone by taking into account sound quality and power consumption in combination with characteristics of different play modes. Specifically, the play mode is dynamically switched based on transmission bandwidth requirements of to-be-played audio data, so that music with higher sound quality requirements can be transmitted to the wireless earphone without loss, while music with lower sound quality requirements can be transmitted to the wireless earphone in a form of lossy compression to reduce power consumption of the wireless earphone and the audio data sender, which provides a wireless earphone solution taking into account both the sound quality and the power consumption.

In order to clarify the objects, characteristics and advantages of the disclosure, embodiments of present disclosure will be described in detail in conjunction with accompanying drawings.

Figure 1:
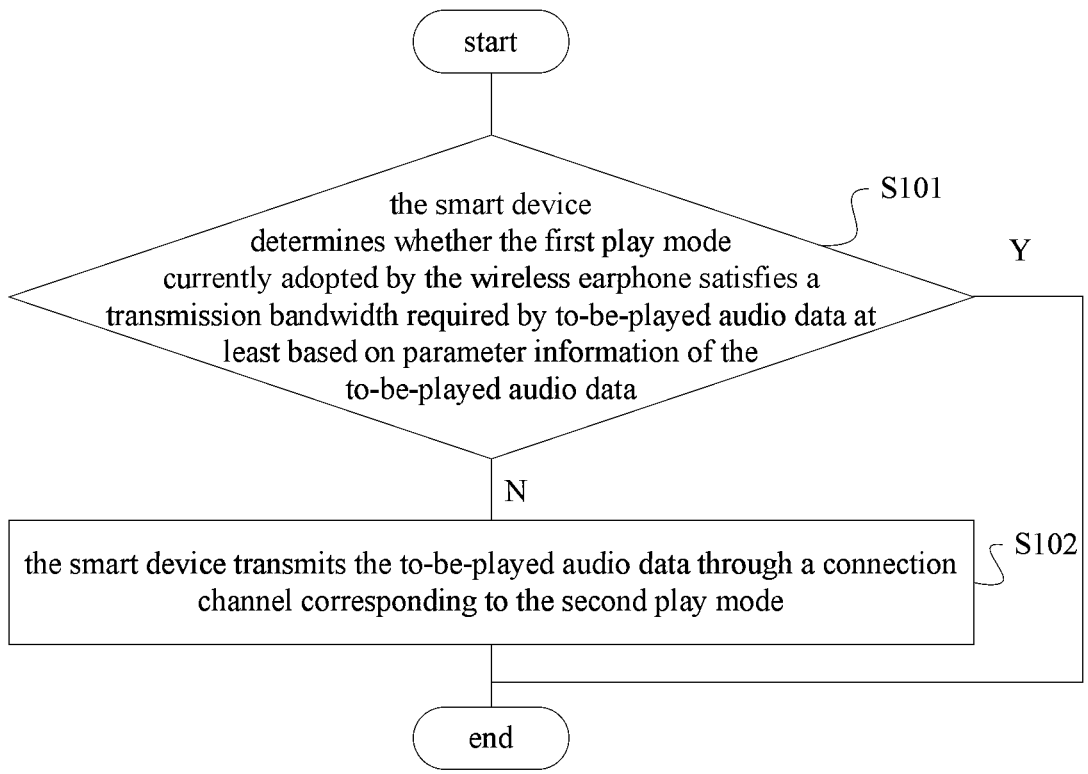
FIG. 1 is a flow chart of an audio data transmission method for a wireless earphone according to an embodiment.

FIG. 1 is a flow chart of an audio data transmission method for a wireless earphone according to an embodiment.

Technical solutions of the present disclosure are applicable to a smart device, such as a cellphone or a PAD. The smart device has at least one wireless communication function selecting from Wi-Fi function and Bluetooth function.

In some embodiments, the play mode adopted by the wireless earphone includes a first play mode and a second play mode. The first play mode may be one of a Bluetooth play mode and a Wi-Fi play mode, and the second play mode may be the other of the Bluetooth play mode and the Wi-Fi play mode.

More specifically, a connection channel corresponding to the Bluetooth play mode is a Bluetooth connection channel (also called a Bluetooth link), and a connection channel corresponding to the Wi-Fi play mode is a Wi-Fi connection channel (also called a Wi-Fi link).

Referring to FIG. 1, the method as shown in FIG. 1 includes S101 and S102.

In S101, the smart device determines whether the first play mode currently adopted by the wireless earphone satisfies a transmission bandwidth required by to-be-played audio data at least based on parameter information of the to-be-played audio data.

Based on a negative determination result of S101, i.e., the first play mode not satisfying the transmission bandwidth required by the to-be-played audio data, the method further includes S102. In S102, the smart device transmits the to-be-played audio data through a connection channel corresponding to the second play mode.

Based on a positive determination result of S101, i.e., the first play mode satisfying the transmission bandwidth required by the to-be-played audio data, the smart device may transmit the to-be-played audio data through a connection channel corresponding to the first play mode.

In some embodiments, the parameter information of the to-be-played audio data is selected from a group consisting of following items: a code rate of the to-be-played audio data, a file format of the to-be-played audio data, and a file size of the to-be-played audio data.

For example, if the wireless earphone is currently playing music in the Bluetooth play mode, the bit rate of the to-be-played audio data is relatively low, and a transmission bandwidth of the Bluetooth connection channel satisfies bandwidth requirements of the to-be-played audio data, it is determined that the determination result of S101 is positive.

On the contrary, if the wireless earphone is currently playing music in the Bluetooth play mode, the bit rate of the to-be-played audio data is relatively high, and the transmission bandwidth of the Bluetooth connection channel does not satisfy the bandwidth requirements of the to-be-played audio data, it is determined that the determination result of S101 is negative.

For another example, if the wireless earphone is currently playing music in the Wi-Fi play mode, the bit rate of the to-be-played audio data is relatively high, and the transmission bandwidth of the Wi-Fi connection channel satisfies the bandwidth requirements of the to-be-played audio data, it is determined that the determination result of S101 is positive.

On the contrary, if the wireless earphone is currently playing music in the Wi-Fi play mode, and the bit rate of the to-be-played audio data is relatively low, it can be considered that the transmission bandwidth of the Wi-Fi connection channel does not satisfy the bandwidth requirements of the to-be-played audio data, and thus the determination result of S101 is negative. In this case, by actively switching to the Bluetooth play mode, power consumption of the wireless earphone may be effectively reduced, which is beneficial to prolong a standby time of the wireless earphone.

Further, both a file format and a file size of the to-be-played audio data can be used to assist in determining the transmission bandwidth requirements of the to-be-played audio data.

In some embodiments, based on a negative determination result of S101, prior to S102, the method further includes determining whether to switch the play mode at least based on power consumption information of the wireless earphone and/or preset switching delay tolerance. Based on determining to switch the play mode, S102 is performed. In this manner, when the currently used first play mode cannot meet the sound quality requirements of the to-be-played music, it does not blindly switch to the second play mode, but performs the switching based on an actual situation of the wireless earphone and user requirements, so as to better take into account both the sound quality and the power consumption.

For example, if the wireless earphone is currently playing music in the Bluetooth play mode, and the bit rate of the to-be-played audio data is relatively high, it is determined whether remaining power of the wireless earphone is sufficient further based on power consumption information of the wireless earphone. If the remaining power of the wireless earphone is low, the play mode is not switched. Alternatively, if the remaining power of the wireless earphone is relatively low, it is determined whether to switch the play mode based on user configuration.

For another example, if the wireless earphone is currently playing music in the Bluetooth play mode, and the bit rate of the to-be-played audio data is relatively high, the play mode switching duration is further compared with the preset switching delay tolerance. If the play mode switching duration is shorter than the preset switching delay tolerance, S102 is performed.

For another example, the wireless earphone is currently playing music in the Bluetooth play mode, but the bit rate of the to-be-played audio data is relatively high. If the remaining power of the wireless earphone is sufficient, and the play mode switching duration is shorter than the preset switching delay tolerance, S102 is performed.

In some embodiments, the preset switching duration tolerance may be an empirical value or may be preset by a user. The preset switching duration tolerance may be used to represent a user's tolerance for music switching delay.

In some embodiments, besides the power consumption information of the wireless earphone and the preset switching delay tolerance, it is also possible to determine whether to switch the play mode based on the user's preference. For example, if the user is currently listening to music outdoors and does not care about sound quality, the play mode of the wireless earphone can be kept in the Bluetooth play mode as much as possible. For another example, if the user is listening to high-quality music at home, and a bit rate of the to-be-played audio data is relatively high, the play mode of the wireless earphone can be kept in the Wi-Fi play mode as much as possible.

In some embodiments, even if the determination result of S101 is positive, when the power consumption information of the wireless earphone indicates that the wireless earphone is not suitable for the current first play mode, S102 may be performed as well.

For example, although the wireless earphone is currently adopting the Wi-Fi play mode to play music, and the bit rate of the to-be-played audio data is relatively high, theoretically, the Wi-Fi play mode should still be used to play the to-be-played audio data in this case. audio data. However, if the power consumption information of the wireless earphone indicates that remaining power of the wireless earphone is relatively low, to prolong a standby time, it is possible to actively switch to the Bluetooth play mode to play the to-be-played audio data.

Figure 2:
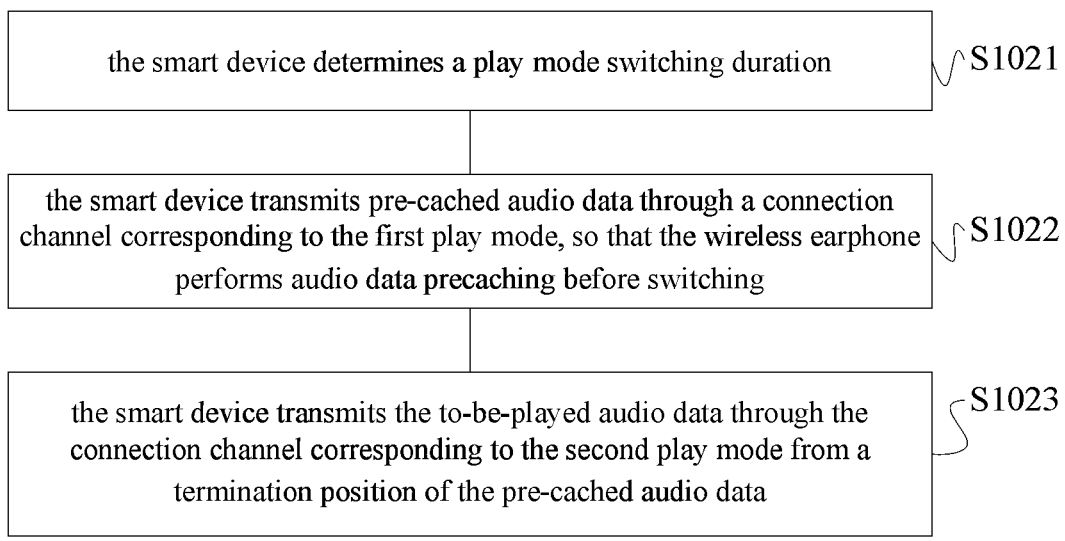
FIG. 2 is a flow chart of S102 in FIG. 1 according to an embodiment.

Referring to FIG. 2, S102 may include S1021, S1022 and S1023.

In S1021, the smart device determines a play mode switching duration.

In S1022, the smart device transmits pre-cached audio data through a connection channel corresponding to the first play mode, so that the wireless earphone performs audio data precaching before switching, wherein a duration of the pre-cached audio data is determined based on the play mode switching duration.

In S1023, the smart device transmits the to-be-played audio data through the connection channel corresponding to the second play mode from a termination position of the pre-cached audio data.

As switching between different play modes may cause delay, the pre-caching way provided in the embodiments may ensure that the play of audio data is not interrupted during the switching, thereby optimizing user experience.

Specifically, the play mode switching duration may be comprehensively determined based on factors such as signal quality of the connection channel corresponding to the second play mode, or data processing capability of the smart device and the wireless earphone.

Further, a duration of the pre-cached audio data is at least not less than the play mode switching duration.

In some embodiments, the pre-cached audio data may belong to a portion of the to-be-played audio data. For example, the switching of the play mode may be triggered during play of a song.

Alternatively, the pre-cached audio data may belong to audio data currently being played by the wireless earphone in the first play mode. For example, the wireless earphone is currently playing a song using the Bluetooth play mode, and switches to the Wi-Fi play mode when playing a next song. In this case, to minimize a switching time between the two songs, S1021 to S1023 may be performed during the play of the previous song to cache at least a portion of the audio data of the previous song. Therefore, when the previous song is played, the Bluetooth connection channel may be disconnected, and the Wi-Fi connection channel may be established to prepare for playing the next song. During this period, as audio data of the previous song is pre-cached to the wireless earphone locally, play interruption may not occur.

In some embodiments, the pre-cached audio data may be stored in a local cache of the wireless earphone.

In some embodiments, between S1022 and S1023, the method may further include during a period when the wireless earphone plays the pre-cached audio data, establishing the connection channel corresponding to the second play mode with the wireless earphone. Therefore, a new connection channel can be established without interrupting play of music.

Alternatively, between S1022 and S1023, the method may further include during the period when the wireless earphone plays the pre-cached audio data, activating the connection channel corresponding to the second play mode which has been established with the wireless earphone in advance. Therefore, based on a new connection channel having been established in advance, the connection channel can be directly activated, so as to further shorten the play mode switching duration.

Further, before being activated, the connection channel corresponding to the second play mode may be in an ultra-low power consumption mode.

In an application scenario, switching from the Wi-Fi play mode to the Bluetooth play mode may include following steps.

a. The wireless earphone is currently in the Wi-Fi play mode.
b. The smart device detects a bit rate of to-be-played music and determines that it needs to switch to the Bluetooth play mode based on power consumption information of the wireless earphone and/or the preset switching delay tolerance.
c. Music pre-caching before switching is performed through the Wi-Fi connection channel.
d. A Bluetooth connection channel is established.
e. The smart device continues to transmit music data to the wireless earphone through the Bluetooth connection channel from a previous cache.
f. The Wi-Fi connection channel enters the ultra-low power consumption mode.

Alternatively, based on the Bluetooth connection channel having been established in advance, the step d may be omitted.

In an application scenario, switching from the Bluetooth play mode to the Wi-Fi play mode may include following steps.

a. The wireless earphone is currently in the Bluetooth play mode.
b. The smart device detects a bit rate of to-be-played music and determines that it needs to switch to the Wi-Fi play mode based on power consumption information of the wireless earphone and/or the preset switching delay tolerance.
c. Music pre-caching before switching is performed through the Bluetooth connection channel, where a code rate of the cached audio data is adapted accordingly according to a transmission bandwidth of the Bluetooth connection channel.
d. The Wi-Fi connection channel exits the ultra-low power consumption mode.
e. The to-be-played audio data continues to be transmitted to the wireless earphone through the Wi-Fi connection channel from a previous cache, where a bit rate of the to-be-played audio data returns to an original value in this case.
f. The Bluetooth connection channel is disconnected according to some configuration parameters.

From above, solutions in the embodiments of the present disclosure enable to switch between different play modes based on quality requirements of to-be-played music and make it possible to realize a wireless true high-definition lossless earphone by taking into account sound quality and power consumption in combination with characteristics of different play modes. Specifically, the play mode is dynamically switched based on transmission bandwidth requirements of to-be-played audio data, so that music with higher sound quality requirements can be transmitted to the wireless earphone without loss, while music with lower sound quality requirements can be transmitted to the wireless earphone in a form of lossy compression to reduce power consumption of the wireless earphone and the audio data sender, which provides a wireless earphone solution taking into account both the sound quality and the power consumption.

Further, when the to-be-played audio data has high requirements on transmission bandwidth, the Wi-Fi transmission mode may be used for transmission, so that the music transmitted to the wireless earphone is not compressed, thereby realizing true high-definition lossless music transmission. When the to-be-played audio data has a low requirement on transmission bandwidth, the Bluetooth transmission mode may be used for transmission, so as to reduce power consumption of the wireless earphone and the smart device.

Further, when the Wi-Fi connection channel is used for audio data transmission, two working modes including an indoor working mode and an outdoor working mode are provided for different terminals pointed by the Wi-Fi connection channel. The indoor working mode may greatly reduce power consumption requirements of smart devices.

Further, the terminal pointed by the Wi-Fi connection channel may be connected to the audio data sender which transmits the to-be-played audio data. The terminal pointed by the Wi-Fi connection channel may be the audio data sender, or a Wi-Fi communication module used for forwarding data between the audio data sender and the wireless earphone.

In some embodiments, the audio data sender includes a server and a smart device. Further, the Wi-Fi communication module may be a wireless router (also called a Wi-Fi router) or a smart device. In the embodiment, a working mode in a case that the terminal pointed by the Wi-Fi connection channel is the wireless router is denoted as the indoor working mode, and a working mode in a case that the terminal pointed by the Wi-Fi connection channel is a smart device is denoted as the outdoor working mode.

Specifically, in the indoor working mode, the wireless earphone may establish a Wi-Fi connection channel with a Wi-Fi router (also called a wireless router), and the Wi-Fi router communicates with the server in a wired or wireless manner. The to-be-played audio data is sent by the server to the Wi-Fi router and transmitted to the wireless earphone through the Wi-Fi connection channel. In this case, the wireless earphone indirectly establishes a Wi-Fi connection channel with the server through the Wi-Fi router. Alternatively, when the server is integrated with a Wi-Fi communication module, the wireless earphone may directly establish a Wi-Fi connection channel with the server.

In the outdoor working mode, the wireless earphone may establish a Wi-Fi connection channel with the smart device, and the to-be-played audio data is transmitted from the smart device to the wireless earphone. Specifically, the to-be-played audio data may be directly stored in the smart device locally. In this case, the wireless earphone directly establishes a Wi-Fi connection channel with the smart device and acquires the to-be-played audio data from the smart device. Alternatively, the to-be-played audio data may be acquired from the server by the smart device through a mobile network in real time. In this case, the wireless earphone indirectly establishes a Wi-Fi connection channel with the server through the smart device and acquires the to-be-played audio data from the server.

In some embodiments, the server may be a cloud server, or may be a local server set in a user's home, office or other places.

Figure 3:
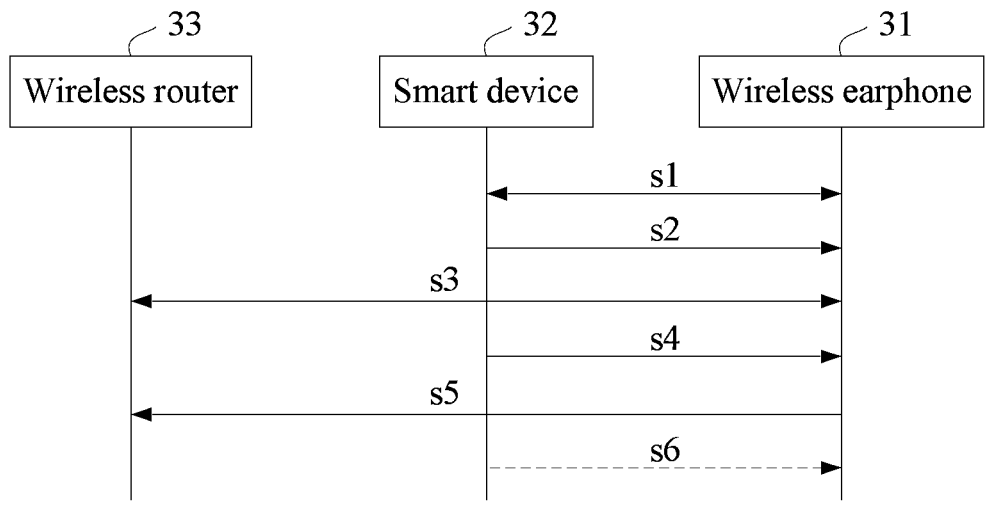
FIG. 3 is a schematic diagram of signaling interaction for establishing a Wi-Fi connection channel in an indoor working mode according to an embodiment.

Referring to FIG. 3, in an application scenario, FIG. 3 is a schematic diagram of signaling interaction for establishing a Wi-Fi connection channel in an indoor working mode according to an embodiment. A process for establishing the Wi-Fi connection channel and transmitting the to-be-played audio data in the indoor working mode may include following steps.

a. A smart device 32 performs s1 to establish a Bluetooth connection channel with a wireless earphone 31.

b. The smart device 32 performs s2 to send Wi-Fi network configuration information which can be used to instruct the wireless earphone 31 to indirectly establish the Wi-Fi connection channel with an audio data transmitter (the server (not shown) in this scenario).

c. The wireless earphone 31 performs s3 to establish a Wi-Fi connection channel with the wireless router 33.

d. In response to the Wi-Fi connection channel being established, an application on the wireless earphone 31 and the server (not shown) realize data communication.

e. A user selects high-definition lossless to-be-played music through an application on the smart device 32, and the smart device 32 performs s4 to send play indication information which indicate the wireless earphone 31 to acquire the to-be-played audio data from the audio data sender (such as the server) through the Wi-Fi connection channel and the wireless router 33.

f. In response to receiving the play indication information, the application on the wireless earphone 31 may perform s5 to acquire the user-selected to-be-played audio data from the server through the Wi-Fi connection channel and the wireless router 33.

In s2, the Wi-Fi network configuration information may be sent through the Bluetooth connection channel. Specifically, the Wi-Fi network configuration information may include a Service Set Identifier (SSID), a Basic Service Set Identifier (BSSID), a Media Access Control (MAC) address, a key and other information of the wireless router 33 that needs to be connected.

In s3, the wireless earphone 31 may be provided with a Wi-Fi connection module for establishing a Wi-Fi connection channel with the wireless router 33.

In s4, the play indication information may be sent through the Bluetooth connection channel established in s1.

Alternatively, the smart device 32 may send the play indication information to the server, and the server may send the play indication information to the wireless earphone 31 through the Wi-Fi connection channel established in s4. In this case, the play indication information may include an ID of the wireless earphone 31, a login account of the application on the smart device 32, or any other identity information that can uniquely identify the wireless earphone 31.

Alternatively, s1 may be initiated by the wireless earphone 31.

Alternatively, the wireless earphone 31 may open a Soft Access Point (SoftAP), and the smart device 32 is connected to the SoftAP to send the Wi-Fi network configuration information.

Alternatively, the Wi-Fi network configuration information may be sent through a Neighborhood Area Network (NAN) or broadcast encrypted information.

Alternatively, when the wireless earphone 31 has stored Wi-Fi network configuration information such as connection information of the wireless router 33, s2 may be omitted, and the wireless earphone 31 may actively perform s3.

Alternatively, during a process of playing the to-be-played audio data by the wireless earphone 31 in the Wi-Fi play mode, the smart device 32 may perform s6 to send play control information to the wireless earphone 31 through the Bluetooth connection channel. The play control information includes audio play parameters used to adjust the wireless earphone 31.

Specifically, the audio play parameters may include increasing a volume, decreasing a volume, playing a previous song, and playing a next song.

Alternatively, the smart device 32 may send the play control information to the server, and the server may send the play control information to the wireless earphone 31 through the wireless router 33 and the Wi-Fi connection channel. In this case, the play control information may further include the ID of the wireless earphone 31, the login account of the application on the smart device 32, and other identity information that can uniquely identify the wireless earphone 31.

In an application scenario, based on whether the to-be-played audio data is stored on the smart device locally, the outdoor working mode is further classified into two cases.

In some embodiments, when the music locally stored on the smart device needs to be played, the application on the smart device directly sending high-definition lossless music data to the application on the wireless earphone.

Figure 4:
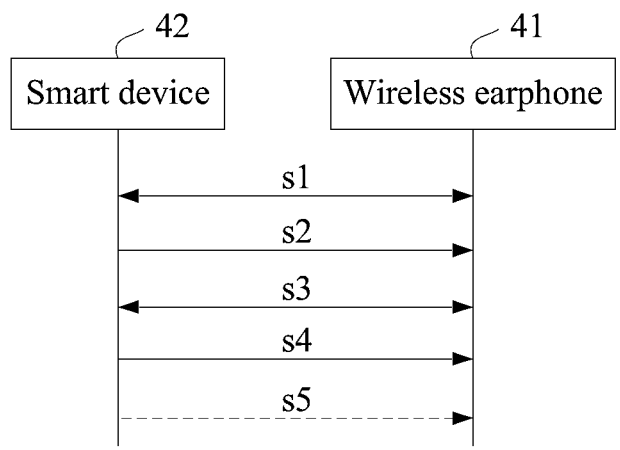
FIG. 4 is a schematic diagram of signaling interaction for establishing a Wi-Fi connection channel in an outdoor working mode according to an embodiment.

Referring to FIG. 4, a process for establishing the Wi-Fi connection channel and transmitting the to-be-played audio data in the outdoor working mode may include following steps.
  a. A smart device 42 performs s1 to establish a Bluetooth connection channel with a wireless earphone 41.
  b. The smart device 42 performs s2 to send Wi-Fi network configuration information which can be used to instruct the wireless earphone 41 to indirectly establish the Wi-Fi connection channel with an audio data transmitter (the smart device 42 in this scenario).
  c. The wireless earphone 41 performs s3 to establish a Wi-Fi connection channel with the smart device 42, where an application on the smart device 42 establishes a connection with an application on the wireless earphone 41.
  d. A user selects high-definition lossless to-be-played music through the application on the smart device 42, and the smart device 42 performs s4 to send the user-selected to-be-played audio data to the wireless earphone 41 through the Wi-Fi connection channel, so that the application on the wireless earphone 41 plays the user-selected to-be-played audio data.

In s2, the Wi-Fi network configuration information may be sent through the Bluetooth connection channel.

In s3, the wireless earphone 31 may be provided with a Wi-Fi connection module for establishing a Wi-Fi connection channel with the smart device 42.

Alternatively, s1 may be initiated by the wireless earphone 41.

Alternatively, during a process of playing the to-be-played audio data by the wireless earphone 41 in the Wi-Fi play mode, the smart device 42 may perform s5 to send play control information to the wireless earphone 41 through the Bluetooth connection channel or the Wi-Fi connection channel. The play control information includes audio play parameters used to adjust the wireless earphone 41.

In some embodiments, when music on the server needs to be played, the application on the wireless earphone establishes a connection with the server using a mobile network of the smart device and acquires high-definition lossless music data for play.

Figure 5:
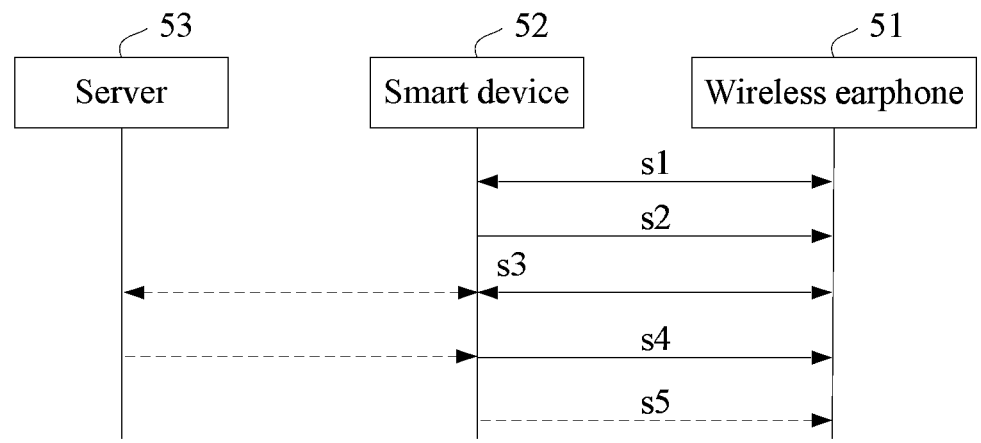
FIG. 5 is a schematic diagram of signaling interaction for establishing a Wi-Fi connection channel in an outdoor working mode according to an embodiment.

Referring to FIG. 5, a process for establishing the Wi-Fi connection channel and transmitting the to-be-played audio data in the outdoor working mode may include following steps.
  a. A smart device 52 performs s1 to establish a Bluetooth connection channel with a wireless earphone 51.
  b. The smart device 52 performs s2 to send Wi-Fi network configuration information which can be used to instruct the wireless earphone 51 to establish the Wi-Fi connection channel with the smart device 52.
  c. The wireless earphone 51 performs s3 to establish a Wi-Fi connection channel with the smart device 52, where an application on the smart device 52 establishes a connection with an application on the wireless earphone 51, and the application on the wireless earphone 51 establishes a connection with a server 53 using a mobile network of the smart device 52.
  d. A user selects high-definition lossless to-be-played music through the application on the smart device 52, and the smart device 52 performs s4 to send play indication information which indicates the wireless earphone 51 to acquire the to-be-played audio data from the server 53 through the Wi-Fi connection channel and the smart device 52.

In s2, the Wi-Fi network configuration information may be sent through the Bluetooth connection channel.

In s3, the wireless earphone 51 may be provided with a Wi-Fi connection module for establishing a Wi-Fi connection channel with the smart device 52.

In s4, in response to receiving the play indication information, the wireless earphone 51 may send play request information to the smart device 52 through the Wi-Fi connection channel, for requesting to acquire the to-be-played audio data. In response to receiving the play request information, the smart device 52 may acquire the to-be-played audio data from the server 53 through the mobile network and transmit the acquired to-be-played audio data to the wireless earphone 51 through the Wi-Fi connection channel.

Alternatively, s1 may be initiated by the wireless earphone 51.

Alternatively, in s4, the play indication information sent by the smart device 52 may include the to-be-played audio data acquired from the server 53 to save signaling overhead.

Alternatively, during a process of playing the to-be-played audio data by the wireless earphone 51 in the Wi-Fi play mode, the smart device 52 may perform s5 to send play control information to the wireless earphone 51 through the Bluetooth connection channel or the Wi-Fi connection channel. The play control information includes audio play parameters used to adjust the wireless earphone 51.

In an application scenario, with a change of a user's position and/or a change of Wi-Fi signal strength of the audio data sender, the indoor working mode and the outdoor working mode may be switched from each other.

For example, when a preset connection channel switching condition is triggered, it may be determined that switching between the two working modes is required.

In some embodiments, the preset connection channel switching condition includes: Wi-Fi signal strength of a terminal pointed by the current Wi-Fi connection channel being lower than a preset threshold; receiving a connection channel switching instruction; Wi-Fi signal strength of a terminal pointed by the updated Wi-Fi connection channel being higher than Wi-Fi signal strength of a terminal pointed by a current Wi-Fi connection channel; or Wi-Fi signal strength of the terminal pointed by the updated Wi-Fi connection channel being higher than the preset threshold.

In a scenario of switching from the indoor working mode to the outdoor working mode, the terminal pointed by the current Wi-Fi connection channel may be a wireless router. In a scenario of switching from the outdoor working mode to the indoor working mode, the terminal pointed by the updated Wi-Fi connection channel may be a wireless router.

For example, in the indoor working mode, the wireless earphone and/or the smart device may regularly monitor Wi-Fi signal strength of the wireless router. When the Wi-Fi signal strength is lower than a preset threshold, or when the current Wi-Fi connection channel is disconnected, or when the user sends a connection channel switching instruction through the smart device to actively initiate switching, it is determined that the indoor working mode needs to be switched to the outdoor working mode.

For another example, in the outdoor working mode, the wireless earphone and/or the smart device may regularly monitor whether there is a suitable wireless router in a surrounding area for connection. If there is a wireless router with a Wi-Fi signal strength higher than the preset threshold in the surrounding area, or, the user sends a connection channel switching instruction through the smart device to actively initiate switching, it is necessary to switch from the outdoor working mode to the indoor working mode.

For another example, in the indoor working mode, the wireless earphone and/or the smart device may also regularly monitor whether there is a more suitable wireless router in the surrounding area. If there is a wireless router with a Wi-Fi signal strength higher than that of the current wireless router, or the user sends a connection channel switching instruction through the smart device to actively initiate switching, it is determined that the Wi-Fi connection channel needs to be re-established.

In some embodiments, the preset threshold may be determined based on characteristic parameters of the to-be-played audio data.

Specifically, the Wi-Fi signal strength is relevant with a Modulation and Coding Scheme (MCS) that the Wi-Fi connection channel can maintain, and the MCS directly affects an actual rate of data transmission. At the same time, considering a noise level of an air channel and power consumption (e.g., in a period, transmission with high MCS consumes less power than transmission with low MCS as a transmission time is shortened). Therefore, for the bit rate of the to-be-played audio data, a corresponding switching threshold (i.e., the preset threshold) may be determined.

For example, assuming that the bit rate of the to-be-played audio data is 5 Mbps, a theoretical rate of MCS may need to be higher than 20 Mbps, and accordingly there may be a corresponding minimum Wi-Fi signal strength which is the preset threshold.

In other words, the higher the bit rate of the to-be-played audio data, the higher the required MCS, and the higher the corresponding minimum Wi-Fi signal strength.

Figure 6:
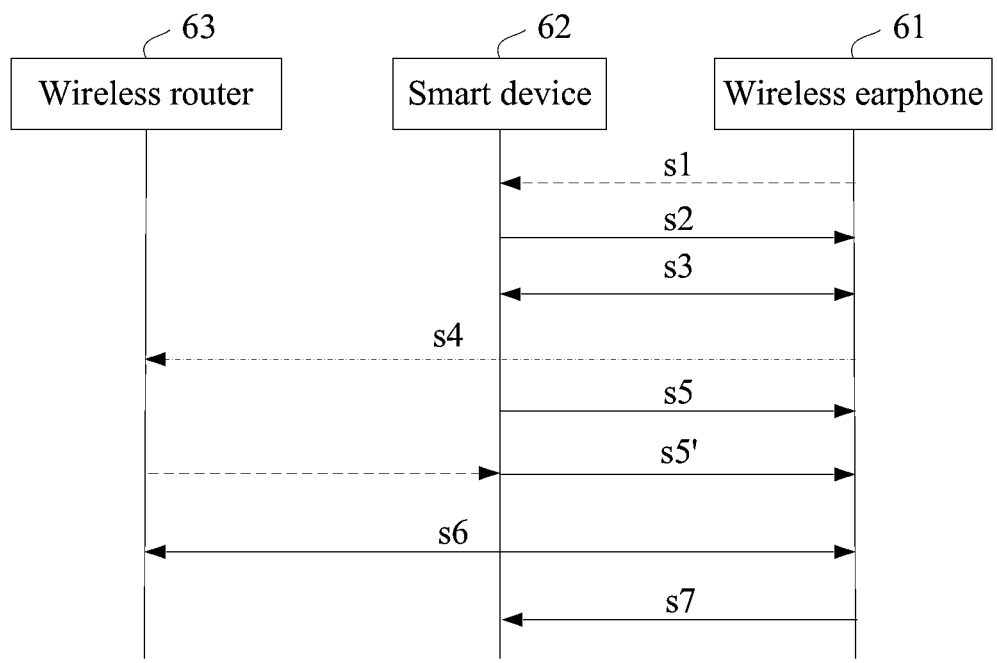
FIG. 6 is a schematic diagram of signaling interaction for a Wi-Fi connection channel switching procedure from an indoor working mode to an outdoor working mode according to an embodiment.

In an embodiment, referring to FIG. 6, for a wireless earphone 61 supporting multiple Wi-Fi connection channels, a process of switching from the indoor working mode to the outdoor working mode may include following steps.

a. Based on any one of the above-mentioned preset connection channels switching conditions being triggered, the wireless earphone 61 may perform s1 to send connection channel switching request information.

b. In response to receiving the connection channel switching request information, the smart device 62 may perform s2 to initiate the switching of the Wi-Fi connection channel and instruct the wireless earphone 61 to perform music precaching before switching based on configuration.

c. The smart device 62 performs s3 to send updated Wi-Fi network configuration information which can be used to instruct the wireless earphone 61 to establish an updated Wi-Fi connection channel directly with the updated audio data sender (the smart device 62 in this scenario). In response to receiving the updated Wi-Fi configuration information, the wireless earphone 61 establishes the updated Wi-Fi connection channel with the smart device 62.

d. In response to the updated Wi-Fi connection channel having been established, the wireless earphone 61 may perform s4 to stop acquiring the to-be-played audio data from the wireless router 63.

In a case of a first outdoor working mode as shown in FIG. 4, in response to the updated Wi-Fi connection channel having been established, the application on the wireless earphone 61 establishes a connection with the application on the smart device 62 to notify it of the precaching of the audio data, and the smart device 62 performs s5 to transmit the to-be-played audio data through the updated Wi-Fi connection channel from a termination position of the pre-cached audio data.

In a case of a second outdoor working mode as shown in FIG. 5, in response to the updated Wi-Fi connection channel having been established, the application on the wireless earphone 61 establishes a connection with the application on the smart device 62 and establishes a connection with the server using a mobile network on the smart device 62. The application on the wireless earphone 61 performs s5' to notify the application on the smart device 62 of the pre-caching of the audio data, and continues to acquire the to-be-played audio data from the server using the mobile network on the smart device 62 from the termination position of the pre-cached audio data. A difference from before switching lies in that the to-be-played audio data is transmitted through the updated Wi-Fi connection channel (i.e., the newly established Wi-Fi connection channel between the smart device 62 and the wireless earphone 61).

e. The wireless earphone 61 may perform s6 to disconnect (also called releasing) the Wi-Fi connection channel with the wireless router 63.

f. The wireless earphone 61 may perform s7 to send switching completion information to the smart device 62.

In s1, the connection channel switching request information may be sent through the current Wi-Fi connection channel, i.e., the Wi-Fi connection channel between the wireless earphone 61 and the server and forwarded by the server to the smart device 62.

Alternatively, the connection channel switching request information may be sent through a Bluetooth connection channel between the wireless earphone 61 and the smart device 62.

In s2, the music pre-switching before switching may include: determining a connection channel switching duration based on a number of Wi-Fi connection channels supported by the wireless earphone 61 simultaneously; transmitting the pre-cached audio data using the current Wi-Fi connection channel (in this scenario, the Wi-Fi connection channel between the wireless earphone 61 and the wireless router 63), so that the wireless earphone 61 performs audio data precaching before switching, wherein a duration of the pre-cached audio data may be determined based on the connection channel switching duration.

For example, for a wireless earphone 61 that supports multiple Wi-Fi connection channels, as the current Wi-Fi connection channel can be disconnected after the updated Wi-Fi connection channel is established, the connection channel switching time is relatively short. Accordingly, the duration of the pre-cached audio data may also be relatively short.

For another example, for the wireless earphone 61 that supports merely one Wi-Fi connection channel simultaneously, as it is necessary to establish the updated Wi-Fi connection channel after disconnecting the current Wi-Fi connection channel, the connection channel switching time is relatively long. Accordingly, the duration of the pre-cached audio data may be appropriately extended.

Following s4, the wireless earphone 61 may play the pre-cached audio data before acquiring the to-be-played audio data from the updated Wi-Fi connection channel.

Alternatively, when the preset connection channel switching condition triggered is receiving a connection channel switching instruction, s1 may be omitted, and the smart device 62 may actively perform s2.

Figure 7:
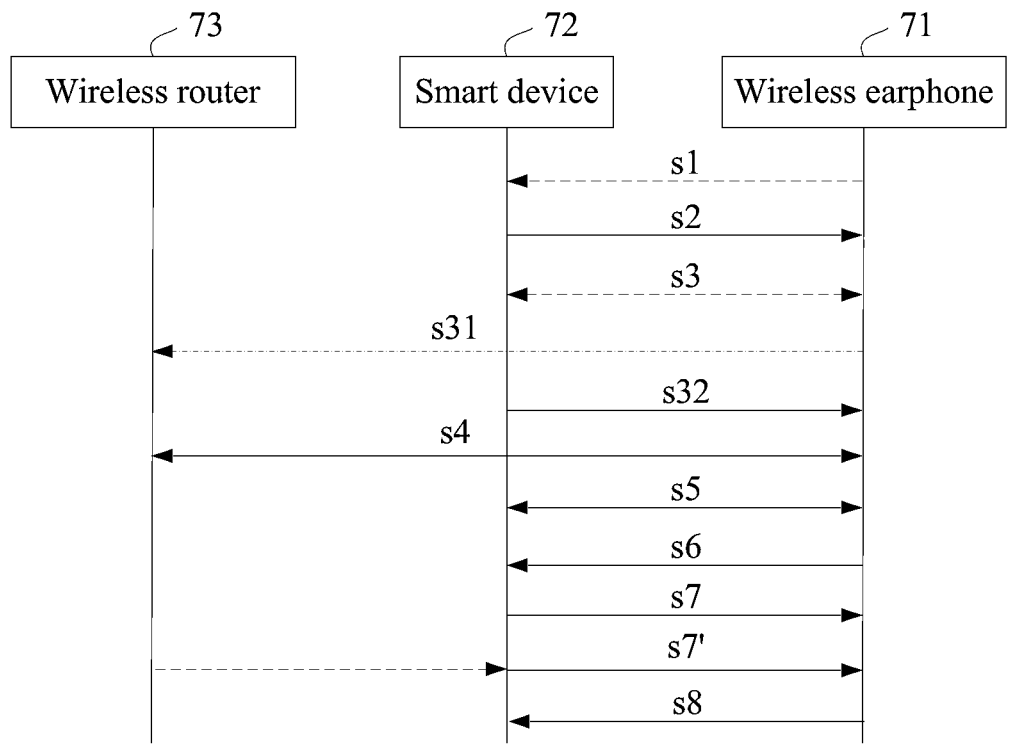
FIG. 7 is a schematic diagram of signaling interaction for a Wi-Fi connection channel switching procedure from an indoor working mode to an outdoor working mode according to an embodiment.

In an embodiment, referring to FIG. 7, for a wireless earphone 71 supporting merely one Wi-Fi connection channel, a process of switching from the indoor working mode to the outdoor working mode may include following steps.
  a. Based on any one of the above-mentioned preset connection channels switching conditions being triggered, the wireless earphone 71 may perform s1 to send connection channel switching request information.
  b. In response to receiving the connection channel switching request information, the smart device 72 may perform s2 to initiate the switching of the Wi-Fi connection channel and instruct the wireless earphone 71 to perform music precaching before switching based on configuration.
  c. The smart device 72 performs s3 to establish a Bluetooth connection channel with the wireless earphone 71. In response to the Bluetooth connection channel having been established, the wireless earphone 71 may perform s31 to stop acquiring the to-be-played audio data from the current Wi-Fi connection channel (in this scenario, the Wi-Fi connection channel between the wireless router 73 and the wireless earphone 71). The wireless earphone 71 also performs s32 to acquire the to-be-played audio data through the Bluetooth connection channel, where a code rate of the to-be-played audio data is adapted accordingly based on a transmission bandwidth of the Bluetooth connection channel.
  d. The wireless earphone 71 may perform s4 to disconnect (also called releasing) the Wi-Fi connection channel with the wireless router 73.
  e. The smart device 72 performs s5 to send the updated Wi-Fi network configuration information which indicates the wireless earphone 71 to establish an updated Wi-Fi connection channel directly with the updated audio data sender (in this scenario, the smart device 72). In response to receiving the updated Wi-Fi configuration information, the wireless earphone 71 establishes an updated Wi-Fi connection channel with the smart device 72.

In the case of the first outdoor working mode as shown in FIG. 4, in response to the updated Wi-Fi connection channel having been established, the application on the wireless earphone 71 establishes a Wi-Fi connection with the application on the smart device 72. The wireless earphone 71 may perform s6 to notify the smart device 72 to disconnect the Bluetooth connection channel with itself. The smart device 72 performs s7 to restore to continue to transmit the to-be-played audio data to the wireless earphone 71 through the updated Wi-Fi connection channel.

In the case of the second outdoor working mode as shown in FIG. 5, in response to the updated Wi-Fi connection channel having been established, the application on the wireless earphone 71 establishes a connection with the application on the smart device 72 and establishes a connection with the server using the mobile network on the smart device 72. The wireless earphone 71 may perform s6 to notify the smart device 72 to disconnect the Bluetooth connection channel with itself. The wireless earphone 71 may also perform s7' to continue to acquire the to-be-played audio data from the server using the mobile network on the smart device 72. A difference from before switching lies in that the to-be-played audio data is transmitted through the updated Wi-Fi connection channel (i.e., the newly established Wi-Fi connection channel between the smart device 72 and the wireless earphone 71).

f. The wireless earphone 71 may also perform s8 to send switching completion information to the smart device 72.

Alternatively, s3 may be regarded as a filtering means to ensure that the play of music is not interrupted during the switching of the connection channel. Before the updated Wi-Fi connection channel (in this scenario, the Wi-Fi connection channel between the smart device 72 and the wireless headset 71) is established, if the pre-cached audio data in s2 has been played, in s3, the smart device 72 may play the to-be-played audio data through the Bluetooth connection channel from the termination position of the pre-cached audio data, until the updated Wi-Fi connection channel is established.

Alternatively, if the duration of the pre-cached audio data in s2 is long enough, s3 may be omitted. Further, in s6, the application on the wireless earphone 71 can notify the application on the smart device 72 of the precaching of the audio data. The smart device 72 may transmit the to-be-played audio data through the updated Wi-Fi connection channel from the termination position of the pre-cached audio data. Alternatively, in s7', the wireless earphone 71 may notify the application on the smart device 72 of the precaching of the audio data and continue to acquire the to-be-played audio data from the server using the mobile network on the smart device 72 from the termination position of the pre-cached audio data.

Figure 8:
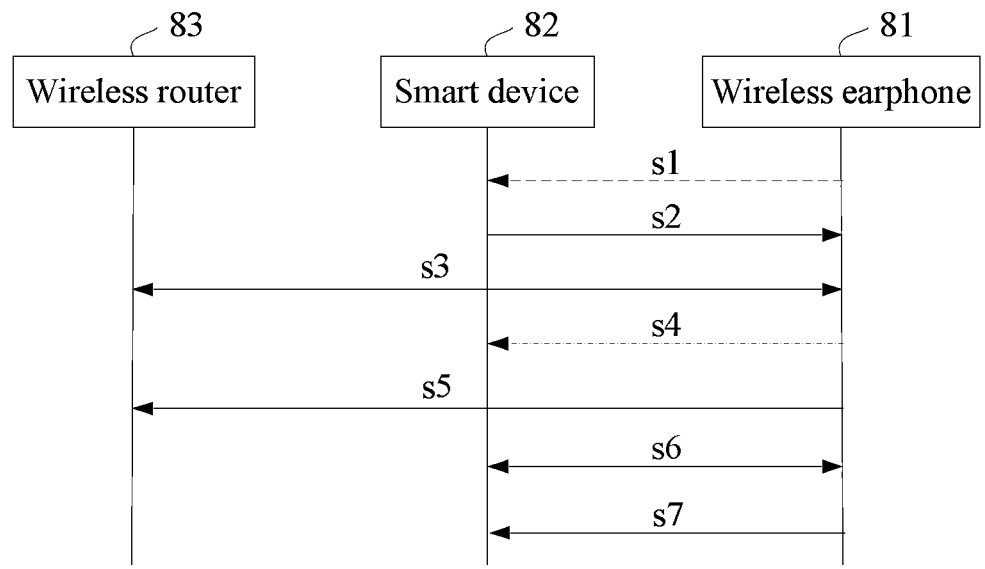
FIG. 8 is a schematic diagram of signaling interaction for a Wi-Fi connection channel switching procedure from an outdoor working mode to an indoor working mode according to an embodiment.

In an embodiment, referring to FIG. 8, for a wireless earphone 81 supporting multiple Wi-Fi connection channels, a process of switching from the outdoor working mode to the indoor working mode may include following steps.
  a. Based on any one of the above-mentioned preset connection channels switching conditions being triggered, the wireless earphone 81 may perform s1 to send connection channel switching request information.
  b. In response to receiving the connection channel switching request information, the smart device 82 may perform s2 to initiate the switching of the Wi-Fi connection channel and instruct the wireless earphone 81 to perform music precaching before switching based on configuration.
  c. The smart device 82 sends updated Wi-Fi network configuration information which can be used to instruct the wireless earphone 81 to establish an updated Wi-Fi connection channel indirectly with the updated audio data sender (the sever in this scenario). In response to receiving the updated Wi-Fi configuration information, the wireless earphone 81 performs s4 to establish the updated Wi-Fi connection channel with a wireless router 83, so as to connect with the server through data communication between the wireless router 83 and the server.
d. In response to the updated Wi-Fi connection channel having been established, the wireless earphone 81 may perform s4 to notify the smart device 82 to stop transmitting the to-be-played audio data.
e. The wireless earphone 81 may perform s5 to acquire the to-be-played audio data from the server through the updated Wi-Fi connection channel from a termination position of the pre-cached audio data.
f. The smart device 82 may perform s6 to disconnect the Wi-Fi connection channel with the wireless earphone 81.
g. The wireless earphone 81 may perform s7 to send switching completion information to the smart device 82.

In s2, the music pre-switching before switching may include: determining a connection channel switching duration based on a number of Wi-Fi connection channels supported by the wireless earphone 81 simultaneously; transmitting the pre-cached audio data using the current Wi-Fi connection channel (in this scenario, the Wi-Fi connection channel between the wireless earphone 81 and the smart device 82), so that the wireless earphone 81 performs audio data precaching before switching, wherein a duration of the pre-cached audio data may be determined based on the connection channel switching duration.

Alternatively, s6 may be initiated by the wireless earphone 81.

Figure 9:
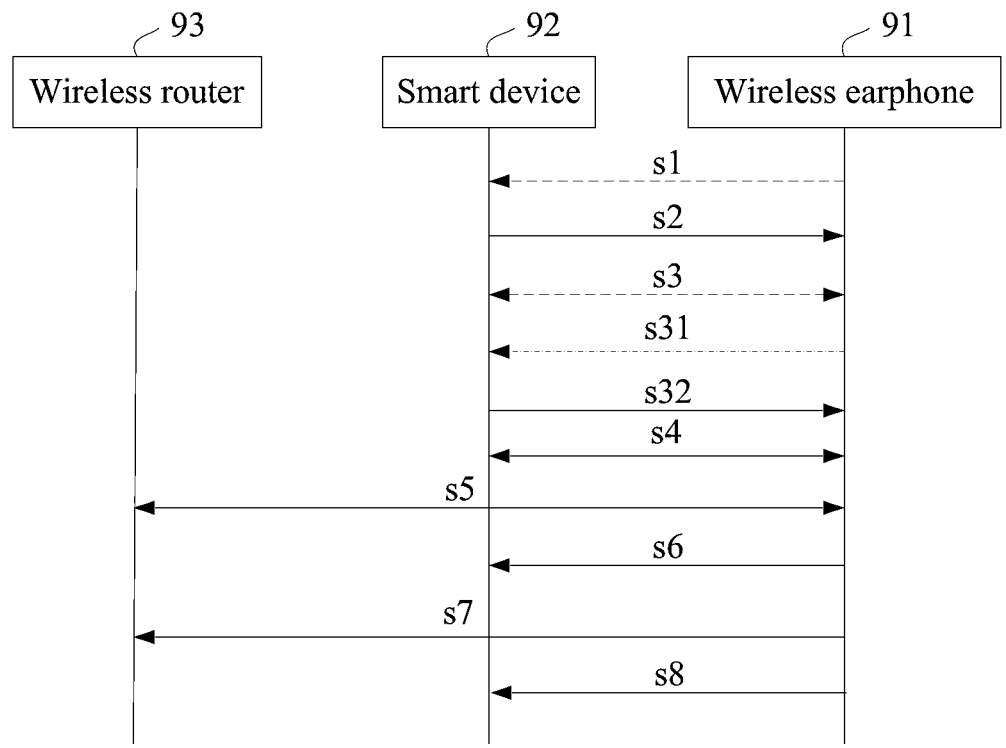
FIG. 9 is a schematic diagram of signaling interaction for a Wi-Fi connection channel switching procedure from an outdoor working mode to an indoor working mode according to an embodiment.

In an embodiment, referring to FIG. 9, for a wireless earphone 71 supporting merely one Wi-Fi connection channel, a process of switching from the outdoor working mode to the indoor working mode may include following steps.
a. Based on any one of the above-mentioned preset connection channels switching conditions being triggered, the wireless earphone 91 may perform s1 to send connection channel switching request information.
b. In response to receiving the connection channel switching request information, the smart device 92 may perform s2 to initiate the switching of the Wi-Fi connection channel and instruct the wireless earphone 91 to perform music precaching before switching based on configuration.
c. The smart device 92 performs s3 to establish a Bluetooth connection channel with the wireless earphone 91. In response to the Bluetooth connection channel having been established, the wireless earphone 91 may perform s31 to stop acquiring the to-be-played audio data from the current Wi-Fi connection channel (in this scenario, the Wi-Fi connection channel between the smart device 92 and the wireless earphone 91). The wireless earphone 91 also performs s32 to acquire the to-be-played audio data through the Bluetooth connection channel, where a code rate of the to-be-played audio data is adapted accordingly based on a transmission bandwidth of the Bluetooth connection channel.
d. The wireless earphone 91 may perform s4 to disconnect (also called releasing) the Wi-Fi connection channel with the smart device 92.
e. The smart device 92 performs s5 to send the updated Wi-Fi network configuration information which indicates the wireless earphone 91 to establish an updated Wi-Fi connection channel indirectly with the updated audio data sender (in this scenario, the server). In response to receiving the updated Wi-Fi configuration information, the wireless earphone 91 establishes an updated Wi-Fi connection channel with a wireless router 93, so as to connect with the server through data communication between the wireless router 93 and the server.
f. In response to the updated Wi-Fi connection channel having been established, the wireless earphone 91 may perform s6 to notify the smart device 92 to disconnect the Bluetooth connection channel with itself.
g. The wireless earphone 91 may also perform s7 to acquire the to-be-played audio data from the server using the updated Wi-Fi connection channel from a termination position of the pre-cached audio data.
h. The wireless earphone 91 may perform s8 to send switching completion information to the smart device 92.

Alternatively, when the second outdoor working mode as shown in FIG. 5 is originally used, an opposite terminal of s31 may be changed to the server, so that the smart device 92 stops receiving the to-be-played audio data from the server.

Alternatively, a release operation of the current Wi-Fi connection channel and an establishment operation of the updated Wi-Fi connection channel may be performed synchronously.

In some embodiments, a way in which the smart device searches the wireless earphone includes but not limited to: Bluetooth connection notification, Digital Living Network Alliance (DLNA), and Wi-Fi vendor specific information element.

Figure 10:
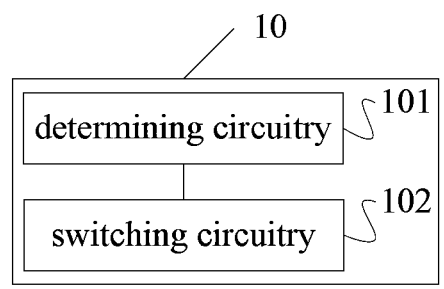
FIG. 10 is a structural diagram of an audio data transmission apparatus for a wireless earphone according to an embodiment.

FIG. 10 is a structural diagram of an audio data transmission apparatus for a wireless earphone according to an embodiment. Those skilled in the art could understand that the audio data transmission apparatus 10 provided in the embodiment may perform the method as shown in FIG. 1 to FIG. 9.

In some embodiments, a play mode adopted by the wireless earphone includes a first play mode and a second play mode.

Referring to FIG. 10, in some embodiments, the audio data transmission apparatus 10 includes: a determining circuitry 101 configured to determine whether the first play mode currently adopted by the wireless earphone satisfies a transmission bandwidth required by to-be-played audio data at least based on parameter information of the to-be-played audio data; and a switching circuitry 102 configured to: based on the first play mode not satisfying the transmission bandwidth required by the to-be-played audio data, transmit the to-be-played audio data through a connection channel corresponding to the second play mode.

Working principles and modes of the audio data transmission apparatus 10 may be referred to the above descriptions of FIG. 1 to FIG. 9, and are not described in detail here.

In an embodiment of the present disclosure, a storage medium having computer instructions stored therein is provided, where when the computer instructions are executed, the above method as shown in FIG. 1 to FIG. 9 is performed. In some embodiments, the storage medium may be a computer readable storage medium and may include a non-volatile or a non-transitory memory, or include a ROM, a RAM, a magnetic disk or an optical disk.

In an embodiment of the present disclosure, a terminal including a memory and a processor is provided, where the memory has computer instructions stored therein, and when the processor executes the computer instructions, the above method as shown in FIG. 1 to FIG. 9 is performed. The terminal may be a smart device, such as a terminal capable of establishing a wireless connection channel with a wireless earphone, e.g., a cellphone or an IPAD.

In an embodiment of the present disclosure, a wireless earphone is provided, including a Bluetooth connection module, a Wi-Fi connection module and a processor, where the processor is configured to call the Wi-Fi connection module according to an indoor working mode or an outdoor working mode to establish a Wi-Fi connection with a corresponding audio data sender. The processor is further configured to call the Bluetooth connection module to establish a Bluetooth connection channel with the terminal.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An audio data transmission method for a wireless earphone, wherein a play mode adopted by the wireless earphone comprises a first play mode and a second play mode, and the method comprises:
   determining whether the first play mode currently adopted by the wireless earphone satisfies a transmission bandwidth required by to-be-played audio data at least based on parameter information of the to-be-played audio data; and
   based on the first play mode not satisfying the transmission bandwidth required by the to-be-played audio data, transmitting the to-be-played audio data through a connection channel corresponding to the second play mode;
   wherein said transmitting the to-be-played audio data through the connection channel corresponding to the second play mode comprises:
      determining a play mode switching duration;
      transmitting pre-cached audio data through a connection channel corresponding to the first play mode, so that the wireless earphone performs audio data pre-caching before switching, wherein a duration of the pre-cached audio data is determined based on the play mode switching duration; and
      transmitting the to-be-played audio data through the connection channel corresponding to the second play mode from a termination position of the pre-cached audio data.

2. The method according to claim 1, wherein prior to transmitting the to-be-played audio data through the connection channel corresponding to the second play mode from a termination position of the pre-cached audio data, said transmitting the to-be-played audio data through the connection channel corresponding to the second play mode further comprises:
   during a period when the wireless earphone plays the pre-cached audio data, establishing the connection channel corresponding to the second play mode with the wireless earphone; or
   during the period when the wireless earphone plays the pre-cached audio data, activating the connection channel corresponding to the second play mode which has been established with the wireless earphone in advance.

3. The method according to claim 1, wherein based on the first play mode not satisfying the transmission bandwidth required by the to-be-played audio data, prior to transmitting the to-be-played audio data through the connection channel corresponding to the second play mode, the method further comprises: determining whether to switch the play mode at least based on power consumption information of the wireless earphone and/or preset switching delay tolerance,
   wherein based on determining to switch the play mode, the to-be-played audio data is transmitted through the connection channel corresponding to the second play mode.

4. The method according to claim 1, wherein the second play mode is a Wi-Fi play mode, and the connection channel corresponding to the Wi-Fi play mode is a Wi-Fi connection channel, a process for establishing the Wi-Fi connection channel comprises:
   sending Wi-Fi network configuration information, wherein the Wi-Fi network configuration information instructs the wireless earphone to establish the Wi-Fi connection channel directly or indirectly with an audio data sender which transmits the to-be-played audio data.

5. The method according to claim 4, wherein the Wi-Fi network configuration information is sent through a connection channel corresponding to the first play mode.

6. The method according to claim 4, wherein the audio data sender comprises a server and a smart device, wherein the smart device is configured to send the Wi-Fi network configuration information.

7. The method according to claim 4, wherein said transmitting the to-be-played audio data through a connection channel corresponding to the second play mode comprises:
   sending play indication information, wherein the play indication information indicates the wireless earphone to acquire the to-be-played audio data from the audio data sender through the Wi-Fi connection channel.

8. The method according to claim 7, wherein the play indication information is sent through the connection channel corresponding to the first play mode or the connection channel corresponding to the second play mode.

9. The method according to claim 4, wherein the process for establishing the Wi-Fi connection channel further comprises:
   when a preset connection channel switching condition is triggered, receiving connection channel switching request information;
   determining a connection channel switching duration based on a number of Wi-Fi connection channels supported by the wireless earphone simultaneously;
   transmitting the pre-cached audio data through a current Wi-Fi connection channel, so that the wireless earphone performs audio data precaching before switching, wherein a duration of the pre-cached audio data is determined based on the connection channel switching duration;
   sending updated Wi-Fi network configuration information, where the updated Wi-Fi network configuration information instructs the wireless earphone to establish an updated Wi-Fi connection channel directly or indirectly with an updated audio data sender; and
   transmitting the to-be-played audio data through the updated Wi-Fi connection channel from a termination position of the pre-cached audio data.

10. The method according to claim 9, wherein before or while or after the updated Wi-Fi connection channel is established, the process for establishing the Wi-Fi connection channel further comprises:
    releasing the current Wi-Fi connection channel.

11. The method according to claim 9, wherein the process for establishing the Wi-Fi connection channel further comprises:
based on play of the pre-cached audio data being completed before the updated Wi-Fi connection channel is established, playing the to-be-played audio data through the connection channel corresponding to the first play mode from the termination position of the pre-cached audio data, until the updated Wi-Fi connection channel is established.

12. The method according to claim 9, wherein the preset connection channel switching condition comprises:
Wi-Fi signal strength of a terminal pointed by the current Wi-Fi connection channel being lower than a preset threshold;
receiving a connection channel switching instruction; or
Wi-Fi signal strength of a terminal pointed by the updated Wi-Fi connection channel being higher than the preset threshold.

13. The method according to claim 1, further comprising:
sending play control information through a connection channel corresponding to the first play mode or the connection channel corresponding to the second play mode, where the play control information comprises audio play parameters used to adjust the wireless earphone.

14. The method according to claim 1, wherein the parameter information of the to-be-played audio data is selected from a group consisting of following items: a code rate of the to-be-played audio data, a file format of the to-be-played audio data, and a file size of the to-be-played audio data.

15. The method according to claim 1, wherein the first play mode is a Bluetooth play mode, and the second play mode is a Wi-Fi play mode; or the first play mode is a Wi-Fi play mode, and the second play mode is a Bluetooth play mode.

16. The method according to claim 15, wherein the connection channel corresponding to the Bluetooth play mode is a Bluetooth connection channel, and the connection channel corresponding to the Wi-Fi play mode is a Wi-Fi connection channel.

17. A non-transitory storage medium storing one or more programs, the one or more programs comprising computer instructions, which, when executed by a processor, cause the processor to:
determine whether a first play mode currently adopted by a wireless earphone satisfies a transmission bandwidth required by to-be-played audio data at least based on parameter information of the to-be-played audio data, wherein a play mode adopted by the wireless earphone comprises the first play mode and a second play mode; and
based on the first play mode not satisfying the transmission bandwidth required by the to-be-played audio data, transmit the to-be-played audio data through a connection channel corresponding to the second play mode;
wherein said transmitting the to-be-played audio data through the connection channel corresponding to the second play mode comprises:
determining a play mode switching duration;
transmitting pre-cached audio data through a connection channel corresponding to the first play mode, so that the wireless earphone performs audio data pre-caching before switching, wherein a duration of the pre-cached audio data is determined based on the play mode switching duration; and
transmitting the to-be-played audio data through the connection channel corresponding to the second play mode from a termination position of the pre-cached audio data.

18. A terminal comprising a memory and a processor, wherein the memory stores one or more programs, the one or more programs comprising computer instructions, which, when executed by the processor, cause the processor to:
determine whether a first play mode currently adopted by a wireless earphone satisfies a transmission bandwidth required by to-be-played audio data at least based on parameter information of the to-be-played audio data, wherein a play mode adopted by the wireless earphone comprises the first play mode and a second play mode; and
based on the first play mode not satisfying the transmission bandwidth required by the to-be-played audio data, transmit the to-be-played audio data through a connection channel corresponding to the second play mode;
wherein said transmitting the to-be-played audio data through the connection channel corresponding to the second play mode comprises:
determining a play mode switching duration;
transmitting pre-cached audio data through a connection channel corresponding to the first play mode, so that the wireless earphone performs audio data pre-caching before switching, wherein a duration of the pre-cached audio data is determined based on the play mode switching duration; and
transmitting the to-be-played audio data through the connection channel corresponding to the second play mode from a termination position of the pre-cached audio data.

* * * * *